US012649278B2

(12) United States Patent
von Dadelszen et al.

(10) Patent No.: US 12,649,278 B2
(45) Date of Patent: Jun. 9, 2026

(54) OPTICAL SYSTEM

(71) Applicant: VulcanForms Inc., Devens, MA (US)

(72) Inventors: Michael von Dadelszen, Merrimack, NH (US); Ramunas Wierzbicki, San Jose, CA (US); Thomas J. Evans, Bedford, MA (US)

(73) Assignee: VulcanForms Inc., Devens, MA (US)

( * ) Notice: Subject to any disclaimer, the term of this patent is extended or adjusted under 35 U.S.C. 154(b) by 70 days.

(21) Appl. No.: 18/524,177

(22) Filed: Nov. 30, 2023

(65) Prior Publication Data

US 2024/0181700 A1    Jun. 6, 2024

Related U.S. Application Data

(60) Provisional application No. 63/429,210, filed on Dec. 1, 2022.

(51) Int. Cl.
| | |
|---|---|
| *B29C 64/264* | (2017.01) |
| *B22F 12/40* | (2021.01) |
| *B22F 12/44* | (2021.01) |
| *B29C 64/124* | (2017.01) |
| *B29C 64/241* | (2017.01) |
| *B33Y 10/00* | (2015.01) |
| *B33Y 30/00* | (2015.01) |

(52) U.S. Cl.
CPC ............ *B29C 64/264* (2017.08); *B22F 12/40* (2021.01); *B22F 12/44* (2021.01); *B29C 64/124* (2017.08); *B29C 64/241* (2017.08); *B33Y 10/00* (2014.12); *B33Y 30/00* (2014.12)

(58) Field of Classification Search
CPC ......... B29C 64/264; B22F 12/40; B22F 12/44
See application file for complete search history.

(56) References Cited

U.S. PATENT DOCUMENTS

| | | | |
|---|---|---|---|
| 9,956,612 | B1 | 5/2018 | Redding et al. |
| 10,022,795 | B1 | 7/2018 | Redding et al. |
| | | (Continued) | |

FOREIGN PATENT DOCUMENTS

| | | | |
|---|---|---|---|
| EP | 3 521 028 | A1 | 8/2019 |
| WO | WO 2025/006255 | A2 | 1/2025 |

OTHER PUBLICATIONS

International Search Report and Written Opinion mailed Apr. 16, 2024 in connection with International Application No. PCT/US2023/081723.

*Primary Examiner* — Timothy Kennedy
(74) *Attorney, Agent, or Firm* — Wolf, Greenfield & Sacks, P.C.

(57) ABSTRACT

An additive manufacturing system has a build surface supporting a precursor material to be fused by incident light energy. The system includes an optics assembly to direct the incident light energy along a beam path in a first direction toward the build surface, and an energy management system. The energy management system includes a beam block disposed along the beam path. The beam block has an aperture allowing the incident light energy to pass through the beam block in the first direction. The beam block also has a surface to absorb or deflect, away from the beam path, light energy traveling in a second direction different from the first direction. The energy management system also includes a heat sink to receive heat energy from at least a portion of the light energy traveling in the second direction.

21 Claims, 8 Drawing Sheets

(56)         References Cited

U.S. PATENT DOCUMENTS

| | | | | |
|---|---|---|---|---|
| 2004/0031851 | A1* | 2/2004 | Bianculli | G06K 7/10811 |
| | | | | 235/462.41 |
| 2006/0146298 | A1* | 7/2006 | Lin | G03B 21/142 |
| | | | | 353/101 |
| 2007/0040034 | A1 | 2/2007 | Hennick et al. | |
| 2011/0186635 | A1* | 8/2011 | Hyde | G02B 7/021 |
| | | | | 235/454 |
| 2011/0186636 | A1 | 8/2011 | Hyde et al. | |
| 2014/0271328 | A1* | 9/2014 | Burris | B23K 26/034 |
| | | | | 419/53 |
| 2016/0158889 | A1 | 6/2016 | Carter et al. | |
| 2016/0297142 | A1* | 10/2016 | Bheda | C09D 11/324 |
| 2016/0368050 | A1 | 12/2016 | Morris et al. | |
| 2017/0021455 | A1 | 1/2017 | Dallarosa et al. | |
| 2017/0056975 | A1 | 3/2017 | Carter et al. | |
| 2017/0123237 | A1* | 5/2017 | DeMuth | B23K 37/0408 |
| 2017/0239884 | A1 | 8/2017 | Batchelder et al. | |
| 2017/0310935 | A1* | 10/2017 | Sinclair | B29C 64/245 |
| 2018/0200792 | A1 | 7/2018 | Redding et al. | |
| 2018/0207722 | A1 | 7/2018 | Feldmann et al. | |
| 2018/0236549 | A1 | 8/2018 | Spears et al. | |
| 2019/0054529 | A1* | 2/2019 | Gaignon | B33Y 30/00 |
| 2019/0143406 | A1 | 5/2019 | Carter et al. | |
| 2019/0299286 | A1 | 10/2019 | Feldmann et al. | |
| 2020/0039000 | A1 | 2/2020 | Sweetland | |
| 2020/0108465 | A1 | 4/2020 | Sweetland | |
| 2020/0230745 | A1 | 7/2020 | Komsta et al. | |
| 2020/0368963 | A1* | 11/2020 | Shimoda | B29C 64/227 |
| 2020/0376761 | A1 | 12/2020 | Sweetland | |
| 2021/0023788 | A1* | 1/2021 | Shimoda | B22F 3/16 |
| 2021/0323071 | A1* | 10/2021 | Mark | B22F 12/17 |
| 2021/0339318 | A1 | 11/2021 | Dunbar et al. | |
| 2022/0009030 | A1* | 1/2022 | von Dadelszen | B23K 26/073 |
| 2022/0035228 | A1* | 2/2022 | McAllister | G03B 21/147 |
| 2023/0056367 | A1 | 2/2023 | Leonardo et al. | |
| 2024/0181564 | A1* | 6/2024 | Ueda | B29C 64/153 |

* cited by examiner

FIG. 2A                   FIG. 2B

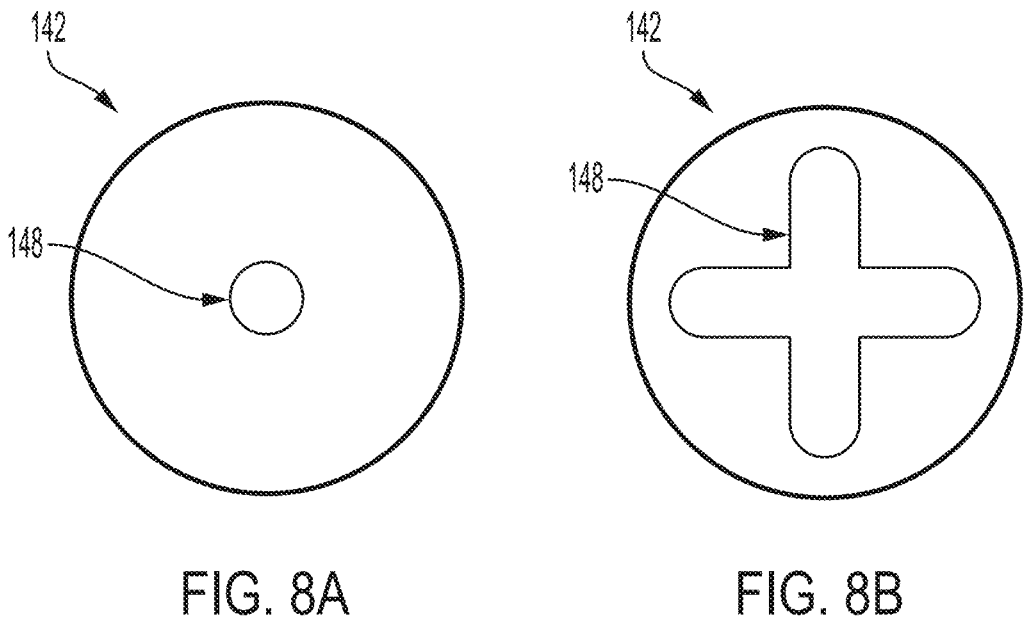
FIG. 8A                    FIG. 8B
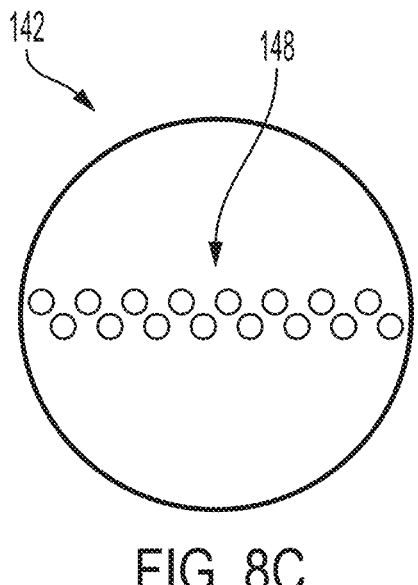
FIG. 8C

OPTICAL SYSTEM

RELATED APPLICATIONS

This application claims priority under 35 U.S.C. § 119(e) to U.S. Provisional Application No. 63/429,210, filed Dec. 1, 2022, the content of which is incorporated by reference in its entirety for all purposes.

FIELD

Disclosed embodiments are related to optical systems and related methods of use, e.g., for an additive manufacturing system.

BACKGROUND

In selective laser melting processes for additive manufacturing, one or more laser spots may be scanned over or otherwise applied to a thin layer of a powder. The powder that is exposed to light energy may be melted and fused into a solid structure. Once a layer is completed, a new layer of powder may be laid down and the process may be repeated. The new layer may be selectively exposed to light energy with at least some portions of powder material melted and fused onto the solid material from the prior layer. This process can be repeated many times in order to build up a three-dimensional shape of nearly any form.

SUMMARY

An optical system for use with an additive manufacturing system may comprise an optics assembly including a plurality of optical components configured to direct laser energy along a beam path toward a build surface to fuse a portion of a precursor material on the build surface. The system may further comprise an optics support structure including a plurality of support columns and a plurality of support plates. Each support plate may span between two or more support columns at a respective location along a length of the support columns and may be configured to support at least one optical component of the optics assembly on the support columns.

In some embodiments, the optical system may be coupled to a gantry system and may be movable in at least one direction by the gantry system. Further, the optical system may be configured to have a maximum displacement of about 40 micrometers in a direction away from an axis of the optical system when the optical system vibrates at a resonance frequency of the system. In some embodiments, the optics assembly and the optics support structure may be configured to have a resonance frequency between about 400 hertz (Hz) and about 450 Hz. Additionally or alternatively, at least one support plate may have a thickness between about 15 millimeters (mm) and about 25 mm. In some embodiments, at least one support column may comprise a tube formed from a composite material. In some embodiments, the plurality of support plates may be configured to maintain alignment of the components during thermal expansion of the support plates. In some embodiments, each support plate may be axisymmetric. Additionally or alternatively, each support plate may have an optical support aperture sized and shaped to supportively receive the at least one optical component. In some embodiments, the optical support aperture may be disposed at or near a center of the support plate. Additionally or alternatively, each support plate may include at least two support coupling holes. Each support coupling hole may be sized and shaped to engage with a respective support column of the at least two support columns, and each support coupling hole may be disposed at or near a periphery of the support plate.

In some embodiments, at least one support plate may be coupled to at least one support column by a clamp comprising a jaw extending from and cooperating with the support plate to form a throat. The throat may be sized and shaped to receive the support column, and a distal end portion of the jaw may include a through hole aligned with a bore hole of the support plate. The through hole and the bore hole may be configured to receive a fastener to adjust a size of the throat to fasten the support column within the throat. In some embodiments, each support plate may be configured to receive a heat transfer conduit carrying working fluid to receive heat energy from the support plate. Further, each support plate may include a thermal coupling hole sized and shaped to receive and make thermal contact with the heat transfer conduit. Additionally or alternatively, the working fluid may circulate through a return conduit disposed within a support column.

In some embodiments, the optical system may further comprise a plurality of heat transfer conduits and a plurality of heat transfer plates. Each of the heat transfer plates may span between two or more heat transfer conduits and may comprise a heat transfer component at least partially surrounding the beam path between two optical components of the system. Each heat transfer plate may further be configured to absorb and/or deflect light energy and/or heat energy. Each of the heat transfer conduits may be in thermal contact with each of the heat transfer plates and may carry working fluid to receive heat energy from the heat transfer plates. Further, at least one of the heat transfer components may comprise a beam block configured to deflect light energy away from the beam path. Additionally or alternatively, at least one of the heat transfer components may comprise a heat sink configured to absorb heat energy. In some embodiments, each of the heat transfer conduits may contain a flow of coolant configured to absorb heat energy from the heat transfer plates and/or the support plates.

In some embodiments, at least one optical component may be supported by two or more support plates. Some optical systems may further comprise two or more support posts extending between the two or more support plates. The at least one optical component may be supported by at least one platform spanning between and supported by the two or more support posts. Additionally or alternatively, one or more support plate may include a channel sized and shaped to receive a coil thermally and fluidly coupled to the heat transfer conduit. In some embodiments, an additive manufacturing system may comprise any of the optical systems described herein, as well as the build surface, and at least one light energy source configured to provide the laser energy to the optics assembly.

In some embodiments, an additive manufacturing system may include a build surface supporting a precursor material to be fused by incident light energy. The system may comprise an optics assembly configured to direct the incident light energy along a beam path in a first direction toward the build surface, and an energy management system. The energy management system may comprise a beam block disposed along the beam path and having an aperture sized and shaped to allow the incident light energy to pass through the beam block in the first direction. The beam block may further include a surface configured to absorb or deflect, away from the beam path, light energy traveling in a second direction different from the first direction. The energy management system may further comprise a heat sink configured to receive heat energy from at least a portion of the light energy traveling in the second direction.

In some embodiments, the heat sink may be in thermal contact with the beam block to receive heat energy from the beam block. Additionally or alternatively, the heat sink may at least partially surround the beam block to absorb light energy deflected away from the beam path by the beam block. In some embodiments, the aperture of the beam block may have a long axis and a short axis, and may measure between about 80 millimeters (mm) and about 95 mm along the long axis and between about 5 mm and about 15 mm along the short axis. In some systems, the surface of the beam block may taper inwardly such that the beam block may be generally formed as a cone, with the aperture extending through the cone along a height of the cone. Additionally or alternatively, the surface may be configured to reflect the light energy traveling in the second direction away from the beam path. In some embodiments, the surface may be configured to deflect the light energy traveling in the second direction toward the heat sink. In some systems, the surface may be configured to deflect at least a portion of the light energy traveling in the second direction in a direction perpendicular to the beam path and toward the heat sink. Additionally or alternatively, the surface may be configured to absorb the light energy traveling in the second direction.

In some embodiments, the system may further comprise a heat transfer conduit configured to carry working fluid thermally coupled to the heat sink and/or the beam block to receive heat energy from the heat sink and/or the beam block. Further, the heat transfer conduit may comprise a thermally conductive pipe contacting the heat sink. Optionally, the beam block and/or the heat sink may be attached to and/or supported by the heat transfer conduit. In some embodiments, the system may further comprise a turbulence inducing component within the pipe configured to induce turbulence and/or vortices within a flow of the working fluid. Some systems may further comprise a coil in thermal contact with the heat sink and/or the beam block and in fluid communication with the heat transfer conduit to carry the working fluid through the coil to receive heat energy from the heat sink and/or the beam block. In some such embodiments, the coil may be disposed in a channel formed in a surface of the heat sink and/or the beam block. In some systems, the heat sink and the beam block may be a single component.

In some embodiments, a method of additive manufacturing may comprise directing incident light energy along a beam path in a first direction toward a build surface supporting a precursor material to be fused by the incident light energy. The method may further comprise deflecting, away from the beam path, light energy traveling in a second direction different from the first direction, and absorbing heat energy from at least a portion of the deflected light energy in a heat sink.

In some embodiments, directing the incident light energy along the beam path may comprise directing the incident light energy through an aperture of a beam block, and deflecting the light energy traveling in the second direction may comprise deflecting, off of a surface of the beam block and away from the beam path, light energy traveling in the second direction. Further, absorbing the heat energy from at least the portion of the deflected light energy in the heat sink may optionally comprise conducting the heat energy from the beam block into the heat sink. Additionally or alternatively, absorbing the heat energy from at least the portion of the deflected light energy in the heat sink may comprise absorbing the heat energy in the heat sink at least partially surrounding the beam block. Some methods may further comprise receiving heat energy from the heat sink and/or the beam block in a heat transfer conduit thermally coupled to the heat sink and/or the beam block. In some embodiments, the method may further comprise flowing a working fluid through a thermally conductive pipe of the heat transfer conduit. Additionally or alternatively, receiving the heat energy in the heat transfer conduit may optionally comprise receiving the heat energy in the working fluid. Some such methods may further comprise inducing turbulence and/or vortices in the flow of coolant, and/or flowing the working fluid through a coil in thermal contact with the heat sink.

In some embodiments, deflecting the light energy traveling in the second direction may comprise deflecting, off of a surface of the heat sink and away from the beam path, light energy traveling in the second direction. Additionally or alternatively, deflecting the light energy traveling in the second direction may comprise reflecting, away from the beam path, the light energy traveling in the second direction. Further, deflecting the light energy traveling in the second direction may optionally comprise deflecting, away from the beam path and towards the heat sink, the light energy traveling in the second direction. Additionally or alternatively, deflecting the light energy traveling in the second direction may comprise deflecting, in a direction perpendicular to the beam path and towards the heat sink, the light energy traveling in the second direction.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

In the drawings, each identical or nearly identical component that is illustrated in various figures may be represented by a like numeral. For purposes of clarity, not every component may be labeled in every drawing. In the drawings:

FIG. 8A shows a top view of one embodiment of a beam block;

FIG. 8B shows a top view of another embodiment of a beam block; and

FIG. 8C shows a top view of a further embodiment of a beam block.

DETAILED DESCRIPTION

Figure 1:
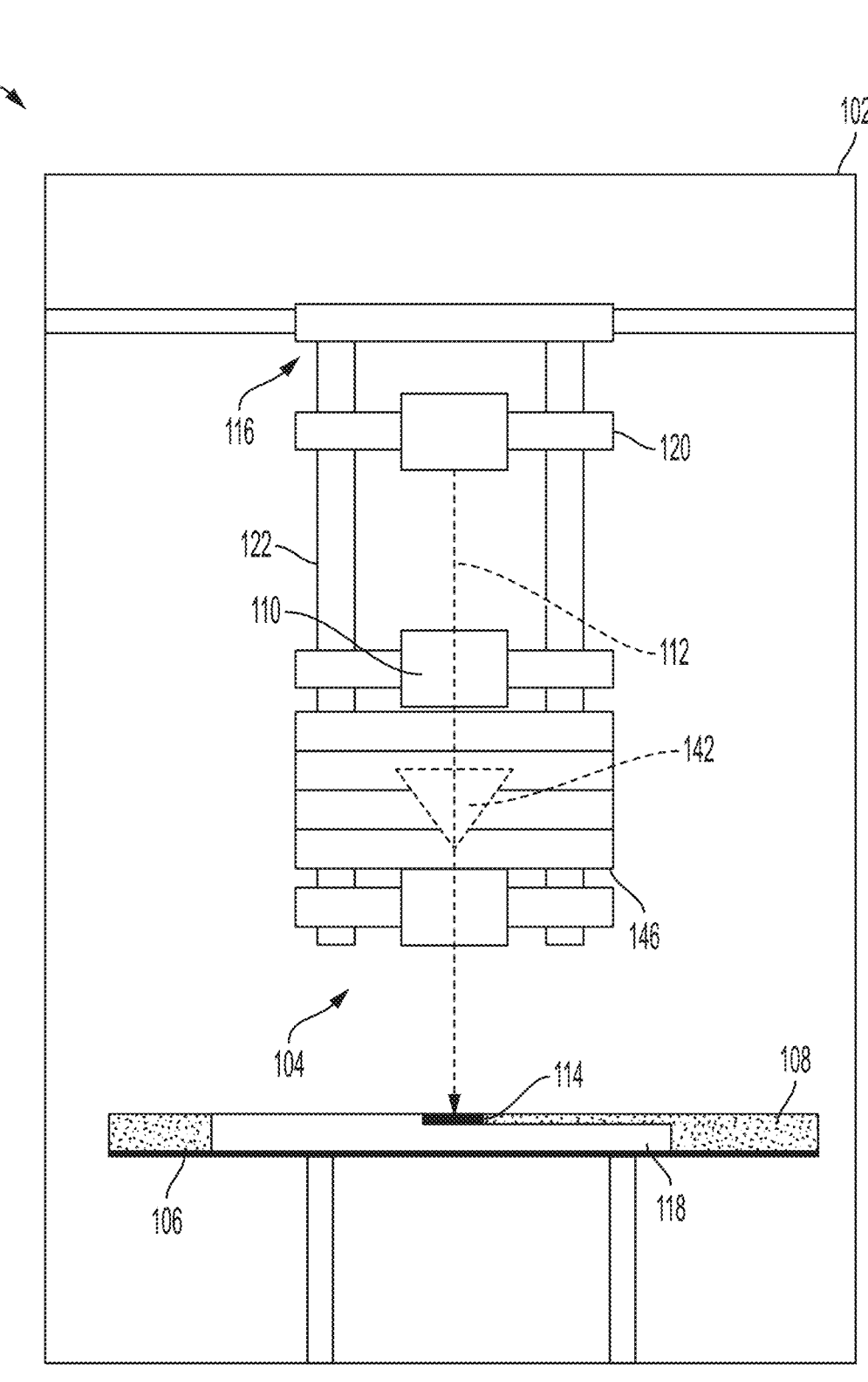
FIG. 1 shows a schematic view of an additive manufacturing system according to one embodiment.

In some laser additive manufacturing applications, precision and predictability in the positioning of the laser throughout a build process may influence the quality, efficiency, or other characteristic of the build process or a product built during the built process. However, some additive manufacturing processes may include movement of an optical system through which the laser or light energy is transmitted. Some additive manufacturing system or optical systems thereof may include an optics assembly comprising one or more optical components, including various fibers, lenses, windows, apertures, mirrors, filters, or other components. These components may direct or guide light energy from a light energy source along a beam path through the optics assembly and toward a build surface in order to fuse portions of a precursor material on the build surface. In some embodiments, the system may scan the light energy across the build surface by moving the optics assembly relative to the build surface.

In some applications, such movement of optical component(s) may cause imprecision or errors in the positioning of a laser spot on the build surface or precursor material. For example, the movement may cause vibrations through or within the optics assembly, which may result in displacement of one or more optical components relative to a nominal or intended position within or relative to the optics assembly. Displacement of the optical component(s) and/or the optics assembly may cause displacement of a laser spot relative to a nominal or intended positioning of the laser spot on the build surface, ultimately resulting in dimensional errors and/or build quality issues in the final built part. It will be appreciated that the magnitude of these displacements and positioning errors may be increased when movement induces vibrations at a resonance frequency of the optics head, as displacements may be made at or near a maximum at resonance frequencies, where amplitudes of vibrations may be at or near a maximum.

In view of the above, the inventors have recognized and appreciated the benefits of an optical system that resists vibrations and resulting displacements in the optical components or the optics assembly. Some optical systems may include an optics support structure to support the optics assembly and to increase a stiffness of the optical system such that the optical system may resist vibrations and/or displacements, at least at a resonance or other selected frequency or frequencies. In some embodiments, an optics support structure may include one or more support plates spanning between two or more support columns. Each support plate may be configured to support at least one optical component of the optics assembly. Some optical systems, optics assemblies, and/or optics support structures may resist vibrations and/or displacements by maintaining a maximum amplitude of vibrations within certain frequency ranges. For example, an optical system may be designed to have a resonance frequency that is higher than a frequency at which the system is likely to vibrate during movement or other operation. This may reduce the risk of the optical system vibrating at its resonance frequency, thereby maintaining the maximum amplitude of vibrations and/or a maximum displacement of optical components below a desired value.

For example, in some embodiments an optical system may be configured to have a resonance frequency greater than or equal to 300 hertz (Hz), 350 Hz, 400 Hz, 450 Hz, and/or any other appropriate frequency. Additionally, an optical system may be configured to have a resonance frequency less than or equal to 500 Hz, 450 Hz, 400 Hz, 350 Hz, and/or any other appropriate frequency. Combinations of the foregoing are contemplated, including, for example, greater than or equal to 300 Hz and less than or equal to 500 Hz, greater than or equal to 300 Hz and less than or equal to 350 Hz, greater than or equal to 400 Hz and less than or equal to 450 Hz, and/or any other appropriate combination of the foregoing. Of course, while particular ranges for the resonance frequency are provided, it should be understood that other ranges both greater than and less than those noted above are also contemplated as the disclosure is not limited in this regard.

Additionally or alternatively, an optical system may be designed to have a maximum displacement at resonance that is equal to or less than a desired value. For example, in some embodiments, an optical system may be configured to have a maximum displacement at resonance that is greater than or equal to 20 micrometers ($\mu$m), 25 $\mu$m, 30 $\mu$m, 35 $\mu$m, or any other appropriate displacement value. Additionally, an optical system may be configured to have a maximum displacement at resonance that is less than or equal to 100 $\mu$m, 50 $\mu$m, 45 $\mu$m, 40 $\mu$m, or any other appropriate displacement. Combinations of the foregoing are contemplated, including, for example, greater than or equal to 20 $\mu$m and less than or equal to 100 $\mu$m, greater than or equal to 35 $\mu$m and less than or equal to 45 $\mu$m, and/or any other appropriate combination of the foregoing. Of course, while particular ranges for the maximum displacement at resonance are provided, it should be understood that other ranges both greater than and less than those noted above are also contemplated as the disclosure is not limited in this regard.

It will be appreciated that a stiffness, resonance frequency, and/or maximum displacement at resonance for an optical system may be influenced by various material and dimensional parameters of the various components of the optical system. Accordingly, the inventors have recognized and appreciated that the stiffness, resonance frequency, and/or maximum displacement at resonance may be influenced at least by physical characteristics of a support plate and/or support column. For example, in embodiments where a support column may be hollow, the stiffness, resonance frequency, and/or maximum displacement may further be influenced by a wall thickness of a support column, although it will be appreciated that a support column may be solid and/or have a varying thickness in some embodiments as well.

Further to the above, some laser additive manufacturing system may include high energy lasers with the capacity to impart large magnitudes of light energy into the precursor material. For example, some additive manufacturing systems may include laser systems with emitted light energy outputs greater than or equal to 10 kilowatts (kW), 50 kW, 75 kW, 100 KW, or any other appropriate laser power. In some applications, a portion of the emitted light energy may be reflected or otherwise be directed in undesired ways. For example, in applications where incident light energy is directed along a beam path in a first direction toward a build surface, some light energy may be reflected back along or adjacent to the beam path in a second direction opposite to or different from the first direction. This light energy may damage various components, including various optical components, of the additive manufacturing system, or may cause components to malfunction.

In view of the above, the inventors have recognized and appreciated the benefits of a system configured to manage unwanted light energy in an optical system. In some embodiments, an optical system may include an energy management system which may include one or more heat transfer components such as a beam block, heat sink, heat transfer plate, and/or heat transfer conduit. For example, a beam block may be disposed along a beam path of an optical system, and may include an aperture to allow incident light energy to pass through the beam block in a first direction along the beam path. The beam block may further include a surface configured to absorb or deflect light energy traveling in a second direction different from the first direction. In various embodiments, the surface may include a surface material, a surface treatment, or a surface finish configured to absorb and/or deflect light energy. For example, in some embodiments, the surface may include a black anodized surface finish, a black optical coating or foil, and/or any other appropriate surface configuration for absorbing light. Additionally or alternatively, in some embodiments, the surface may include an anodized surface finish, a reflective coating or foil (e.g., copper, gold, steel, or other reflective material), and/or any other appropriate surface configuration for reflecting or deflecting light. In some embodiments, a beam block may be formed from any appropriate coated or uncoated material for partially or completely absorbing, reflecting, and/or deflecting light energy, including copper, gold, steel, aluminum, and/or any other appropriate material or combination of materials, including materials having an absorbing coating such as an optical black coating (e.g., Acktar Black Coating, produced by Acktar Ltd., of Kiryat Gat, Israel), and/or materials having a reflective coating (e.g., a gold coating).

The size and shape of an aperture in a beam block may correspond to the size and shape of the laser beam carrying the incident light energy at the point along the beam path where the beam block is intended to be positioned. In some embodiments, the laser beam may be formed from a plurality of individual laser pixels. The pixels may be formed in any appropriate shape or arrangement. For example, the pixels may be formed in an elongate arrangement, or may form an elliptical pattern, such that the laser beam has a long axis and a short axis. Some beam blocks may correspondingly include an aperture having a long axis and a short axis. In various embodiments, the long and short axes may be any appropriate lengths, such as 60 to 110 millimeters or any intermediate value (e.g., 80 to 95 millimeters) for the long axis, 2 to 20 millimeters or any intermediate value (e.g., 5 to 15 millimeters) for the short axis and any combination of lengths for the long and short axes. Of course, while particular ranges for the long and short axes are provided, it should be understood that other ranges both greater than and less than those noted above are also contemplated as the disclosure is not limited in this regard.

Additionally or alternatively, some optical systems or energy management systems thereof may include a heat transfer component comprising a heat sink. A heat sink may be configured to receive heat energy from at least a portion of the light energy traveling in the second direction. In some embodiments, the heat sink may at least partially surround the beam path, and some heat sinks may at least partially surround a surface of a beam block such that light energy deflected by the surface may be absorbed by the heat sink. In some embodiments, the heat sink may include at least one surface having a surface material, a surface treatment, or a surface finish configured to absorb light energy. For example, in some embodiments, the surface may include a black anodized surface finish, a black optical coating or foil, and/or any other appropriate surface configuration for absorbing light. In some embodiments, a heat sink may be formed from any appropriate coated or uncoated material for partially or completely absorbing, reflecting, and/or deflecting light energy, including copper, gold, steel, aluminum, and/or any other appropriate material or combination of materials, including materials having an absorbing coating such as an optical black coating (e.g., Acktar Black Coating), and/or materials having a reflective coating (e.g., a gold coating). In some embodiments, a beam block and a heat sink may be a single component, such that a surface of a beam block is configured to receive heat energy from at least a portion of the light energy traveling in the second direction.

Additionally, in some embodiments, an optical system or an energy management system thereof may include a heat transfer component comprising a heat transfer conduit in thermal contact with and/or configured to receive heat energy from a beam block, a heat sink, a support plate, or other component of an optical system. In some embodiments, a heat transfer conduit may be configured to carry a working fluid, for example water or a coolant, to receive a portion of the heat energy from the optical system and to carry the heat energy away from the optical system. In some embodiments, a heat transfer conduit may comprise a pipe, a tube, a coil, or a channel in thermal contact with one or more components of the optical system. In various embodiments, a heat transfer conduit may be any appropriate material, including any appropriate metal, alloy, composite or any other appropriate type of material. In some embodiments, a heat transfer conduit may comprise a metal having a high thermal conductivity, such as copper, silver, aluminum, or others. Additionally, a working fluid may be any fluid appropriate for receiving heat from the support plate, including any appropriate gas or liquid. In some embodiments, the working fluid may comprise a coolant or a refrigerant, although in other embodiments the working fluid may comprise water.

In some applications, portions of the light energy which may be received by the various components may cause one or more components to undergo thermal expansion. In some applications, thermal expansion may affect or alter a position of various components, which may impact the operation of the optical system. For example, thermal expansion of an optical component or a part supporting an optical component may alter a position of an optical component along the beam path. This may cause the optical component to be misaligned with respect to the beam path, which may cause portions of the incident light energy to be misdirected along the beam path. Deviation in optical alignments resulting from thermal expansion may therefore result in dimensional errors and/or build quality issues in the final built part.

In view of the above, the inventors have recognized and appreciated the benefits of an optical system including support components which are configured to maintain a position of one or more optical components during thermal expansion. In some embodiments, such support components may be symmetric or axisymmetric such that a center point, an axis, or other feature of the component maintains a desired position within the optical system during thermal expansion or contraction. In some embodiments, a support plate configured to support an optical component may be formed in a symmetric or axisymmetric geometry to maintain alignment of the optical component during thermal expansion cycles. For example, the support plate may be formed in a generally triangular axisymmetric geometry, such that a position of an axis of the support may be maintained during thermal expansion cycles.

In addition to the above, some laser additive manufacturing systems may be configured to move an optical system or an optics assembly thereof at high rates of speed and/or at high magnitudes of acceleration. Some systems may move an optical system or an optics assembly at accelerations of several times the acceleration due to gravity. For example, some systems may move an optical system at up to 2 g (i.e., 2 times the acceleration of gravity), 3 g, 4 g, 5 g, or any other appropriate magnitude of acceleration. Additionally or alternatively, some systems may move an optical system at speeds up to 1 meter per second (m/s), 2 m/s, or any other appropriate speed. In some embodiments, the optical system may be coupled to a gantry system configured to move the optical system at the desired speeds and/or accelerations. It will be appreciated that the mass or weight of an optical system may influence the power required to move the optical system at a desired speed or acceleration, as well as the forces resulting from moving the optical system at a desired acceleration. For example, a heavier optical system may require greater power to move at a given speed or acceleration than a lighter optical system, and may generate greater forces at a given acceleration than the lighter system.

In view of the above, the inventors have recognized and appreciated the benefits of an optical system designed to be light in weight. Accordingly, some optical systems may include an optics support structure, an optics assembly, and/or an energy management system designed to be light in weight and/or formed, at least in part, from various lightweight materials. In some embodiments, the light weight configuration may reduce the power required to move the optical system at a desired speed or acceleration. Additionally or alternatively, certain configurations may provide the benefits of lightweight manufacture in addition to the stiffness and/or thermal benefits discussed above. For example, in some embodiments, a support column may be formed from a suitably shaped and sized composite material to be sufficiently lightweight to reduce the power requirement associated with movement and sufficiently stiff to increase the resonance frequency of the structure or to reduce a maximum displacement experienced by the structure in response to certain accelerations. Additionally or alternatively, in some embodiments, a support column, support plate and/or a heat transfer component may be sized, shaped and/or formed from a suitable material to reduce the power requirement associated with movement, to increase or otherwise tune the resonance frequency or to reduce a maximum displacement experienced by the structure in response to high accelerations. In some cases, materials used to form components may have appropriate thermal properties (e.g., thermal conductivity, thermal resistivity, coefficient of thermal expansion, etc.) for managing energy received by the optical system from the light energy.

In various embodiments, an optical system or optics support structure may have any appropriate mass or weight to provide desired characteristics such as resonance frequency and/or displacement. For example, in some embodiments, an optics support structure, including any support plates and/or support columns, may have a mass of between 5 kilograms (kg) and 50 kg or any intermediate value. Of course, while particular ranges for the mass of an optics support structure are provided, it should be understood that other ranges both greater than and less than those noted above are also contemplated as the disclosure is not limited in this regard.

It will be appreciated that any embodiments of the systems, components, methods, and/or programs disclosed herein, or any portion(s) thereof, may be used to form any part suitable for production using additive manufacturing. For example, a method for additively manufacturing one or more parts may, in addition to any other method steps disclosed herein, include the steps of selectively fusing one or more portions of a plurality of layers of precursor material deposited onto the build surface to form the one or more parts. This may be performed in a sequential manner where each layer of precursor material is deposited on the build surface and selected portions of the upper most layer of precursor material is fused to form the individual layers of the one or more parts. This process may be continued until the one or more parts are fully formed.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 shows a schematic depiction of an additive manufacturing system 100 according to one embodiment. The additive manufacturing system 100 may comprise a build volume 102 that contains an optical system 104 suspended above a build surface 106 that supports a precursor material 108. The precursor material 108 may be any appropriate material for additive manufacturing, including any appropriate plastic, metal, polymer, composite, or other powdered or non-powdered material. The optical system 104 may include an optics assembly comprising one or more optical components 110, which may be configured to direct incident light energy 112 along a beam path through the optical system 104 toward the build surface 106. The optics assembly or optical components 110 may be supported by an optics support structure, which may include one or more support plates 120 and two or more support columns 122. The optical system 104 may further include an energy management system, which may comprise various heat transfer components including a beam block 142 and one or more heat sinks 146.

At a point where the light energy 112 is incident on the precursor material 108, the incident light energy 112 may create a melt pool 114 by melting a portion of the precursor material. The optical system 104 may be moveable relative to the build surface by a gantry system 116 to scan the incident light energy 112 across various portions of the precursor material 108. After being exposed to the light energy, melted portions of precursor material may cool, solidify, and/or fuse together. When adjacent portions of the precursor material have previously been melted, fused, and/or solidified, the melted portion may fuse with the adjacent portions to form a built part 118. This process may be conducted iteratively, with a new layer of precursor material being deposited on top of the built part 118 until the built part is completed.

Figure 2:
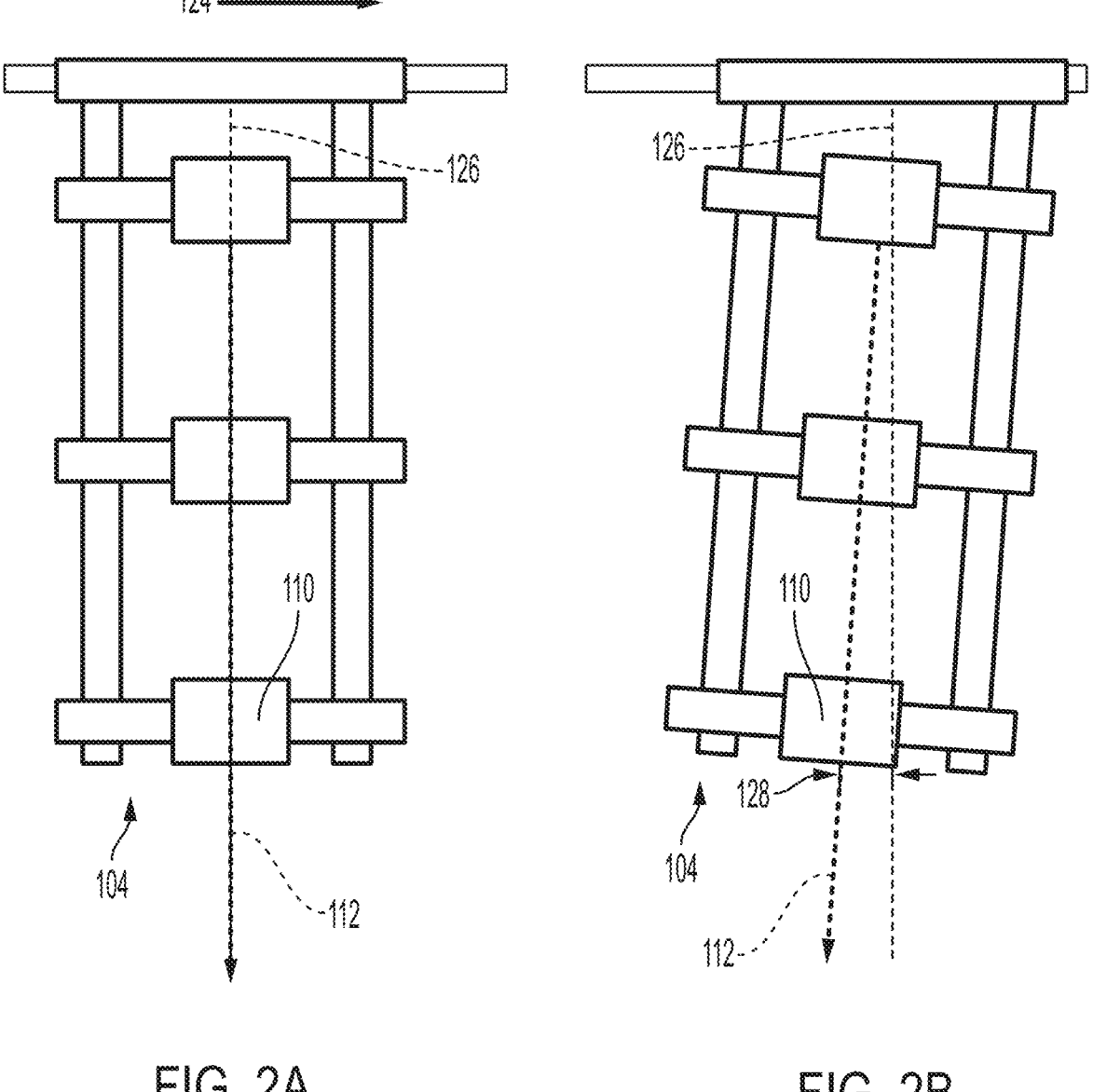
FIG. 2A shows a schematic view of one embodiment of an optical system in a stationary condition.
FIG. 2B shows a schematic view of the embodiment of FIG. 2A while the optical system is in motion.

FIGS. 2A-2B show schematic views depicting movement along a direction 124 of one embodiment of an optical system 104. In the embodiment of FIGS. 2A-2B, the energy management system has been removed for clarity of illustration. In FIG. 2A, the optical system 104 may be in a stationary condition. In FIG. 2B, the optical system 104 may be subjected to acceleration by application of force to move the system 104 in direction 124. In this example, the force is applied only to an uppermost part of the optical system 104 rather than being applied equally to each component of the system. As shown in the figures, an optical system may have an intended beam path 126, e.g., toward a build surface. In some embodiments, the intended beam path 126 may be linear and may coincide with an optical axis of the optical system 104, although it will be appreciated that the intended beam path and/or the optical axis may be any appropriate linear or nonlinear path through or between any number of optical components. When the optical system 104 is stationary, as shown in FIG. 2A, the optical components 110 may be properly aligned to direct the incident light energy 112 along the intended beam path 126. However, as will be appreciated with reference to FIG. 2B, the optical components 110 may become misaligned relative to the intended beam path 126 when subjected to acceleration or deceleration. For example, forces causing acceleration along direction 124 may cause a displacement 128 of an optical component 110 from an intended alignment of the optical component. The displacement 128 of an optical component may cause the incident light energy 112 to deviate from the intended beam path 126, which may cause the incident light energy to melt or fuse a portion of precursor material which was not intended to be melted or fused. This may create dimensional errors or infidelities in the built part. As will be appreciated, the forces and displacements resulting from acceleration and deceleration of an optical system may generate vibrations within the optical system which may propagate and/or attenuate over a period of time. During the attenuation period, the displacements may oscillate between successive peaks of the vibrations, resulting in further dimensional infidelities in the built part.

Figure 3:
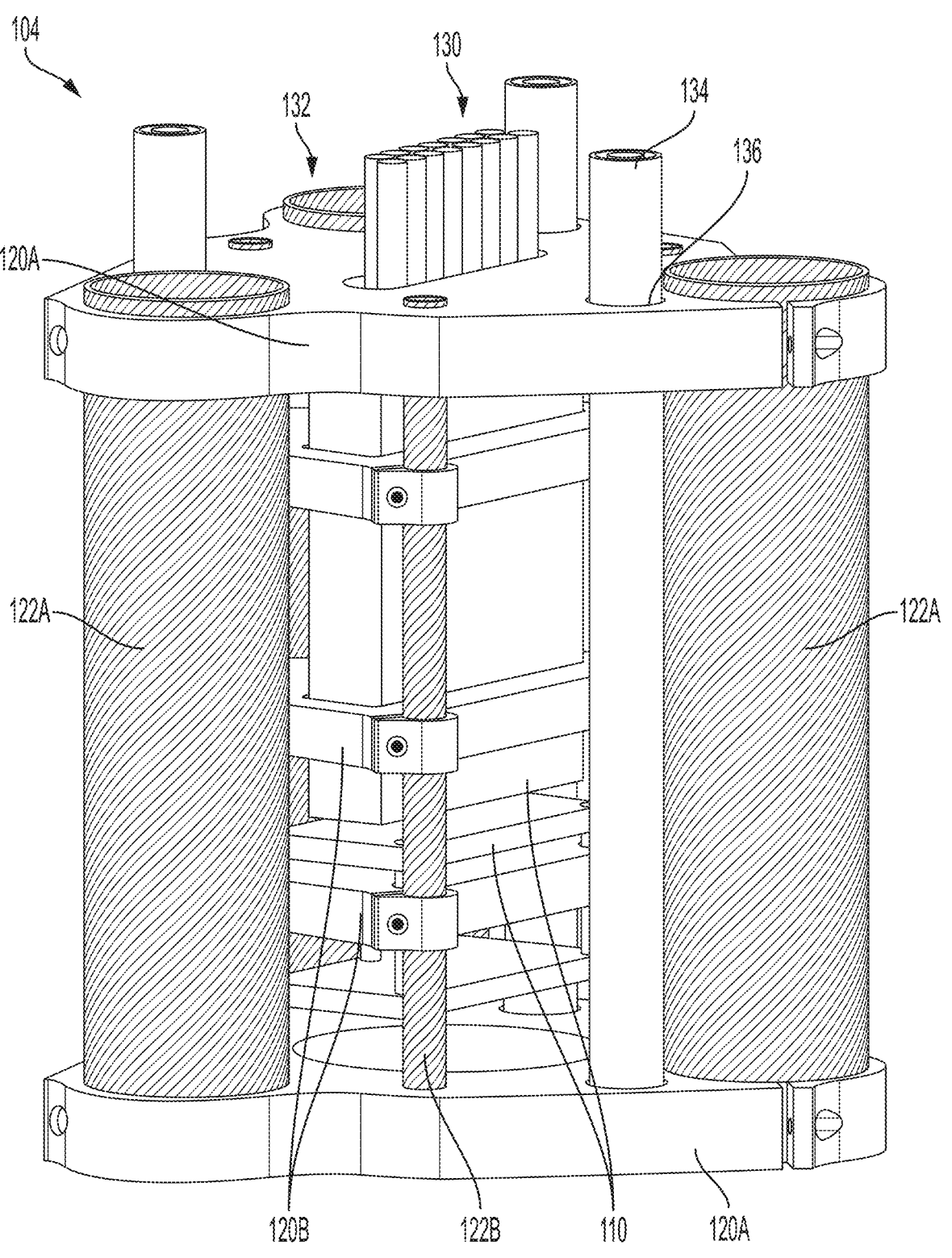
FIG. 3 shows a perspective view of an optical system according to one embodiment.

FIG. 3 depicts one embodiment of optical system 104 including an optics assembly 130, which may be configured to direct light energy along a beam path toward a build surface. The optics assembly 130 may include various optical components 110. An optical component may include any appropriate element of an optical system, including any appropriate fiber, lens, window, aperture, mirror, filter, beam block, or any combination thereof. In some embodiments, the optical system may further include an optics support structure 132. The optics support structure may include a plurality of support columns 122A and a plurality of support plates 120A. In some embodiments, each support plate 120A may span between two or more support columns 122A at a respective location along a length of the support columns 122A. Additionally, each support plate may be configured to support at least one optical component 110 of the optics assembly 130. In some embodiments, the support columns and/or support plates may be configured to reduce displacements of optical components as discussed above, for example by increasing a stiffness and/or tuning a resonance frequency of the optical system in a desired way.

In some embodiments, an optical component may be supported by two or more support plates. For example, an optics support structure may include a nested arrangement of support columns and support plates, such that a secondary support structure may be supported by a primary support structure. In some embodiments, one or more primary support plates 120A may span between two or more primary support columns 122A. Two or more secondary support columns 122B may span between and be supported by the two or more primary support plates 120A. One or more secondary support plates 120B may span between and be supported by the secondary support columns 122B. Each of the secondary support plates 120B may support an optical component 110. Because the secondary support plate may be supported by secondary support columns spanning between two or more primary support plates, each optical component may ultimately be supported by the primary support plates 120A. In some embodiments, the secondary support columns may be smaller than the primary support columns. Additionally or alternatively, the secondary support plates may be smaller than the primary support plates, e.g., to fit within a space between the primary support columns. Additionally, although the embodiment shown includes only two primary support plates spanning between three primary support columns, and three secondary support plates spanning between three secondary support columns, it will be appreciated that an optical support structure may include any appropriate number of support plates and support columns, as the disclosure is not limited in this regard. Similarly, although the embodiment shown includes only primary and secondary support structures, it will be appreciated that an optical support structure may include any appropriate number of support structures, including any appropriate number of nested support structures, including only a single (i.e., non-nested) support structure.

Further to the above, an optical system according to the present disclosure may include an energy management system which may include at least one heat transfer conduit in thermal contact with at least one support plate. A heat transfer conduit may be configured to receive heat from the at least one support plate in order to provide a cooling or other heat transfer effect to the support plate. For example, each primary support plate 120A may be in thermal contact with a heat transfer conduit 134. In some embodiments, a heat transfer conduit 134 may be disposed within a through-hole 136 of the support plate, which may be sized and shaped to receive and make thermal contact with the heat transfer conduit. In other embodiments, a heat transfer conduit may be disposed along a surface of a support plate, e.g., within a groove formed in a surface of a support plate. Although through-holes, surface contact, and grooves are discussed herein, it will be appreciated that a support plate may be configured to physically and/or thermally contact a heat transfer conduit in any appropriate arrangement as the disclosure is not limited in this regard. Each heat transfer conduit may be configured to carry a working fluid, which may receive heat energy from the support plate through the heat transfer conduit. For example, in some embodiments, a heat transfer conduit may be a pipe configured to carry a working fluid therethrough.

Figure 4:
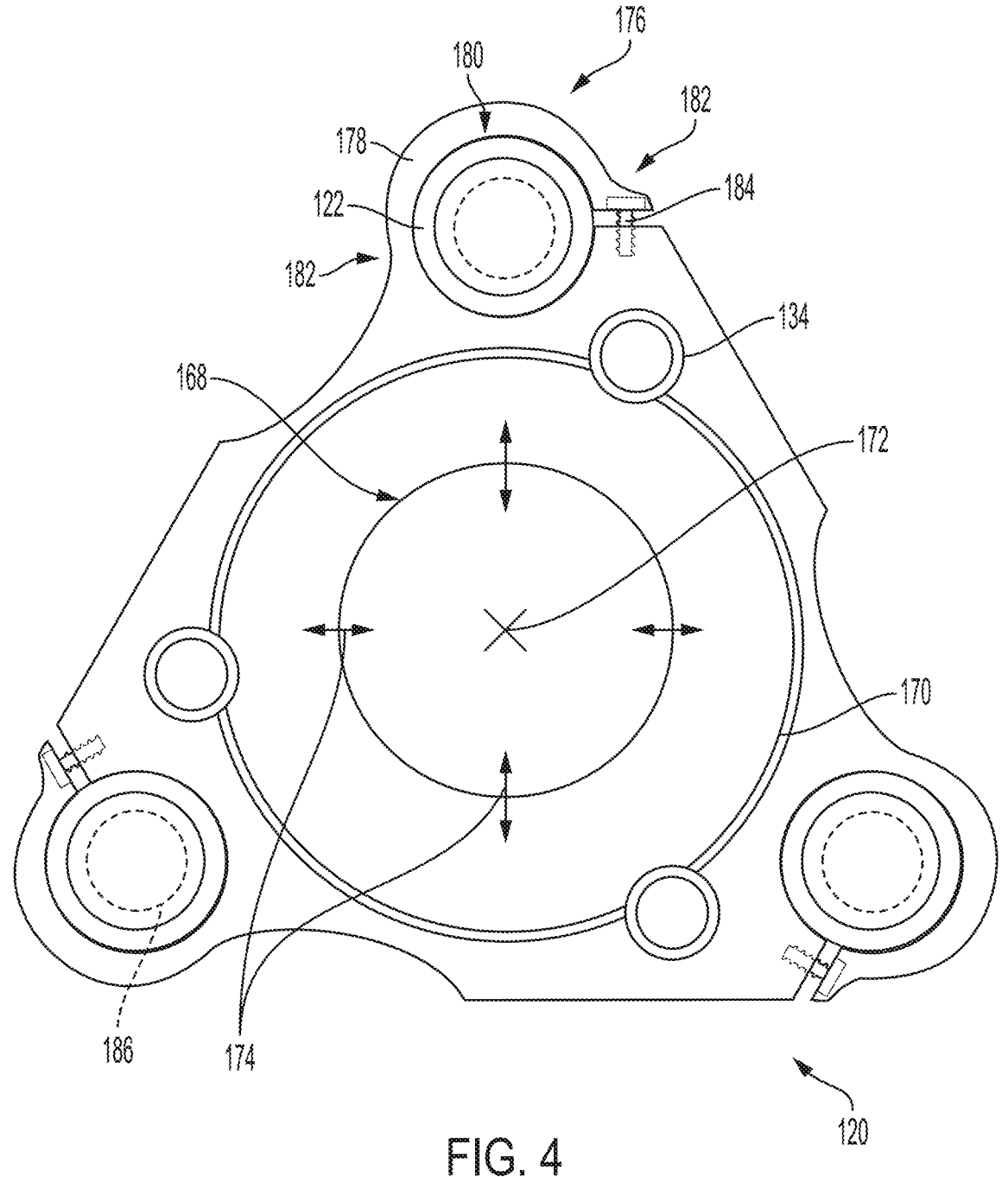
FIG. 4 shows a top view of one embodiment of a support plate.

FIG. 4 depicts an embodiment of a single support plate 120 spanning between three support columns 122. In some embodiments, the support plate 120 may include an optics support aperture 168 sized and shaped to supportively receive an optical component. Although the figure depicts a circular optics support aperture 168, it will be appreciated that an optical component may be supported by any appropriate arrangement, including apertures having a rectilinear geometry or any other regular or irregular geometry. Additionally, the support plate 120 may be in thermal contact with one or more heat transfer conduits 134, which may be received in through-holes of the support plate. Further, in some embodiments, a heat transfer conduit 134 may optionally be fluidly coupled to a coil or other conduit 170 in thermal contact with the support plate. For example, in some embodiments, a coil 170 may be disposed within a groove formed in a surface of the support plate. A coil 170 may be configured to carry the working fluid to and/or from the heat transfer conduit 134 to transfer heat between the support plate and the working fluid. In some embodiments, a heat transfer conduit 134 may optionally be fluidly coupled to a channel 186 configured to carry working fluid to and/or from a heat transfer conduit 134. The channel 186 may function to transport working fluid to and/or from a heat exchanger or other component to transfer heat to and/or from the working fluid. For example, the channel 186 may be coupled to a heat exchange circuit which may operate to adjust a temperature of the working fluid. For example, a heat exchange circuit may include a pump, a heat exchanger, a chiller, and/or any other appropriate components. In various embodiments, the channel may comprise any material appropriate for carrying the working fluid, including any appropriate plastic such as polyvinyl chloride (PVC), cross-linked polyethylene (PEX), perfluoroalkoxy alkane (PFA), tetrafluoroethylene (TFE), or any other appropriate material. In some embodiments and as shown, a channel 186 may optionally be disposed within a support column 122 or an internal volume thereof. In some embodiments, heat transfer conduits 134 may be eliminated and one or more channels 186 may fluidly couple to a conduit 170 to supply and/or receive working fluid to exchange heat with respect to a support plate.

From the top view of FIG. 4, it will be appreciated that a support plate may be formed having a symmetric geometry with respect to an axis 172 of the support plate. In some embodiments, a support plate may be configured to support an optical component which may be centered on or otherwise oriented around an axis which may coincide with a beam path of incident light energy passing through the optical component. For example, the optical support aperture 168 may be centered around the axis 172 such that an optical component may direct incident light energy along the axis 172. It will be appreciated that, during operation of the optical system in some applications, absorbed light or heat energy may cause thermal expansion of some components of the optical system. For example, the support plate 120 may expand or contract in the radial direction(s) of lines 174 as the system is heated and cooled during operation. As will be appreciated, any asymmetry in the expansion or contraction of the support plate may cause an optical component to become misaligned with the axis 172, which may cause the optical component to direct incident light energy in a direction that is misaligned with the axis. Accordingly, a support plate may be formed in a symmetric or axisymmetric geometry to maintain alignment of an optical component during thermal expansion/contraction. For example, the support plate 120 may be formed in a generally triangular axisymmetric geometry as shown, such that the axis 172 may be maintained at or near a center of the optical support aperture 168 during thermal expansion and contraction of the optical support aperture 168 in the radial direction(s) 174.

Also shown in FIG. 4 is a coupling mechanism between a support plate and a support column according to some embodiments. It will be appreciated that a support plate may be coupled to a support column in any appropriate configuration, including insertion of support columns into support coupling holes, which may comprise through-holes formed in the support plate. However, in some applications, it may be desirable to control or adjust a tightness of fit between the support column and support plate, for example to limit a rattling, shaking, or play between the support column and the support plate during movement of the optical system. Accordingly, in some embodiments, a clamp 176 may include a jaw 178 extending from the support plate 120. The jaw 178 may include a proximal end portion 180 extending from the support plate and a distal end portion 182 spaced apart from the support plate. The jaw 178 may cooperate with the support plate 120 to form a throat 180, which may be sized and shaped to receive a support column 122. The distal end portion 182 may be adjustably or controllably couplable to the support plate 120, such that the coupling may be adjusted or controlled to selectively tighten or loosen the throat 180 around the support column 122. For example, in some embodiments, the distal end portion 182 may include a through hole through which a threaded fastener 184 may be inserted. The through hole may be aligned with a threaded bore hole of the support plate, such that the threaded fastener 184 may engage with the bore hole while the threaded fastener is inserted into the through hole of the distal end portion. As will be appreciated, the throat may be selectively tightened or loosened around the support column by selectively turning the threaded fastener in one direction or the other.

Figure 5:
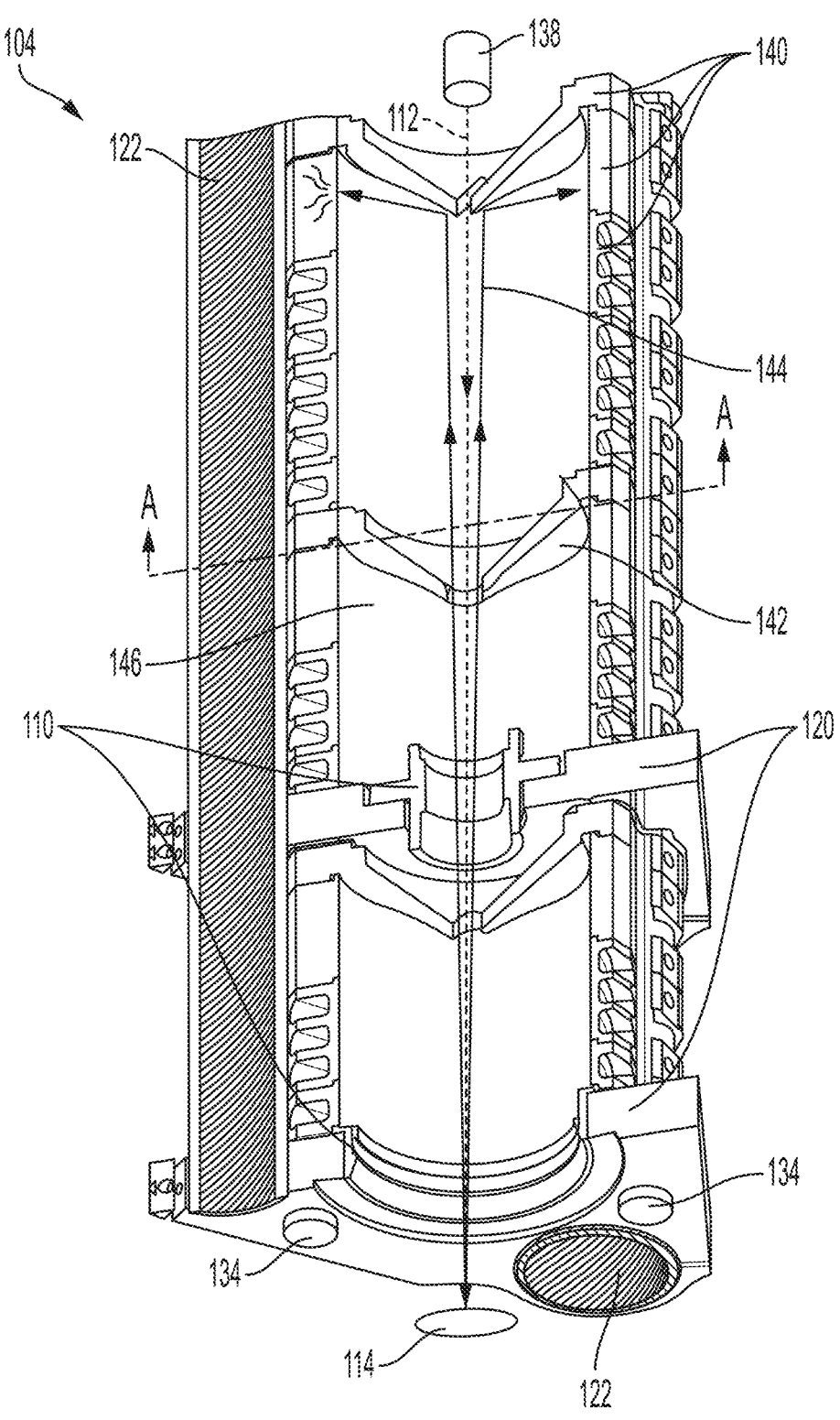
FIG. 5 shows a cross-sectional view of one embodiment of an optical system.

FIG. 5 depicts a cross-sectional view of one embodiment of an optical system 104 or a portion of an optical system 104. The embodiment of FIG. 5 may include an optics assembly having one or more optical components 110. The optical components 110 may include singlet or doublet lens arrangements, or any other appropriate optical component configured to direct incident light energy 112 from a light energy source 138 toward a build surface to form a melt pool 114 from a precursor material disposed on the build surface. The optical system 104 may further include an optics support structure comprising support plates 120 and support columns 122 as described above. Additionally, the optical system 104 may include an energy management system configured to receive light energy 144 traveling in a second direction during operation of the laser system, and/or to transfer the light energy as heat energy. In some embodiments, the light energy 144 may result from incident light energy that is reflected or scattered in the second direction off of the melt pool 114. Additionally or alternatively, the light energy 144 may be released from fiber cladding of various fiber optics components, or the light energy 144 may be deflected, reflected, scattered, diffracted, or refracted at an interface with an optical component or aperture. Accordingly, although the second direction is illustrated as being opposite or nearly opposite the first direction of the incident light energy 112, it will be appreciated that the second direction may be any appropriate direction, as light energy may be traveling in various directions including directions opposite to, nearly or partially opposite to, and/or different from the first direction.

In some embodiments, the energy management system may include a plurality of heat transfer components, which may include heat transfer conduits 134, heat transfer plates 140, beam blocks, and/or heat sinks. In some embodiments, a heat transfer conduit 134 may extend through each of the support plates 120 and through a plurality of heat transfer plates 140. Each of the heat transfer plates may at least partially surround a beam path along which the incident light energy 112 may be directed by the optics assembly. Each of the heat transfer conduits 134 may be in thermal contact with at least one of the heat transfer plates 140 to receive heat energy from the heat transfer plates. In addition to being in thermal contact with one or more heat transfer conduit, each heat transfer plate may comprise or be coupled to a heat sink and/or a beam block, each of which may be configured to receive and/or transfer energy (e.g., light energy and/or heat energy).

In some embodiments, a beam block 142 may be disposed along the beam path as shown, and may include an aperture sized and shaped to allow the incident light energy 112 to pass through the beam block in a first direction (e.g., toward the build surface). The beam block 142 may further include a surface configured to absorb or deflect, away from the beam path, the light energy 144 traveling in a second direction different from the first direction. Additionally or alternatively, in some embodiments, a heat transfer plate 140 may comprise or be coupled to a heat sink 146 configured to receive heat energy from at least a portion of the light energy 144 traveling in a second direction. In some embodiments, a heat sink 146 may at least partially surround a beam block 142 to absorb light energy 144 deflected away from the beam path by the beam block. In some embodiments, a beam block may be configured to receive heat energy from at least a portion of the light energy traveling in the second direction, such that the beam block may additionally function, at least in part, as a heat sink. A beam block may be thermally coupled to heat transfer plate 140 so that heat energy can be transferred from the beam block to the heat transfer plate 140, and optionally from the heat transfer plate 140 to a heat transfer conduit 134 or other component. Portions of a heat transfer plate 140 that receive more heat and/or light energy may be made to have relatively larger mass than portions that receive less heat and/or light energy. For example, as can be seen in FIG. 5, portions of the heat transfer plate 140 that receive reflected energy from a beam block 142 may be made to have a greater radial thickness and/or without radially extending fins on an outer surface. In contrast, portions that receive no or less reflected energy from a beam block may be made radially thinner and/or to have radially extending fins on an outer surface.

Figure 6:
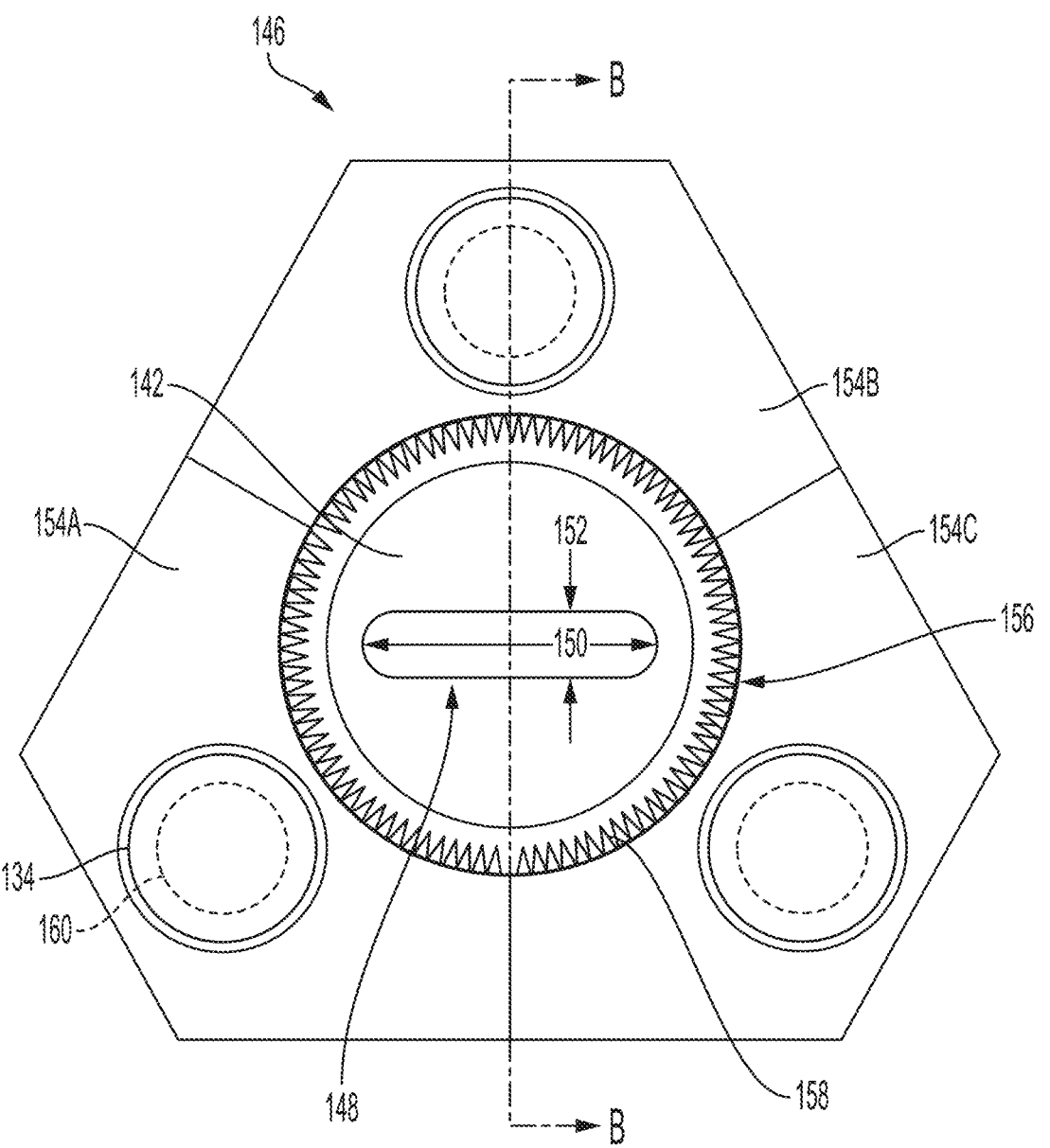
FIG. 6 shows a top view of a portion of an energy management system of an optical system according to one embodiment.

FIG. 6 depicts a cross-section of one embodiment of an energy management system of an optical system according to the present disclosure, for example as taken along line A-A of FIG. 5. In the cross-sectional view, it can be seen that a heat sink 146 may surround a beam block 142 in order to receive light energy deflected off of a surface of the beam block. Additionally, the beam block 142 may include an aperture 148 of any appropriate size or shape to allow incident light energy to pass therethrough at a given point along a beam path. It will be appreciated that the incident light energy may comprise a laser beam which may change size or shape along a beam path in some applications, and that the size and shape of an aperture of a beam block may be selected to correspond to the beam geometry at the point where the beam block is to be disposed. In some embodiments (for example, in applications where multiple laser pixels are aggregated into a single laser beam), a laser beam may have an oblong or elliptical shape at certain points along the beam path. Accordingly, in some embodiments, an aperture 148 may have a correspondingly oblong or elliptical shape such that the aperture has a long axis 150 and a short axis 152.

Additionally shown in FIG. 6, a heat sink may optionally be formed in multiple pieces which may be assembled together within the optical system. In some applications, this arrangement may simplify manufacture or assembly of an optical system. In some embodiments, the heat sink 146 may include a first portion 154A, a second portion 154B, and a third portion 154C, with each portion forming part of an inner surface 156. In some embodiments, the inner surface 156 may optionally include a geometry configured to improve a heat transfer rate at the inner surface. For example, in some embodiments, the inner surface 156 may optionally include a plurality of fins 158 to facilitate heat transfer into the heat sink. Although the figure depicts an inner surface 156 having a plurality of fins, it will be appreciated that other embodiments may include an inner surface having any appropriate features or geometry, including a flat surface (e.g., to simplify manufacturing of the heat sink). In some embodiments, each of the first, second, and third portions 154A-154C may be coupled to, supported by, and/or in thermal contact with a separate heat transfer conduit 134. Each heat transfer conduit may be configured to receive heat energy from the respective portion of the heat sink. In some embodiments, a heat transfer conduit 134 may optionally include a component configured to alter a flow of working fluid through the heat transfer conduit in order to improve a heat transfer rate from the heat sink into the working fluid. For example, a heat transfer conduit may optionally include a turbulence inducing component 160 which may be configured to create turbulence and/or vortices in the working fluid.

Figure 7:
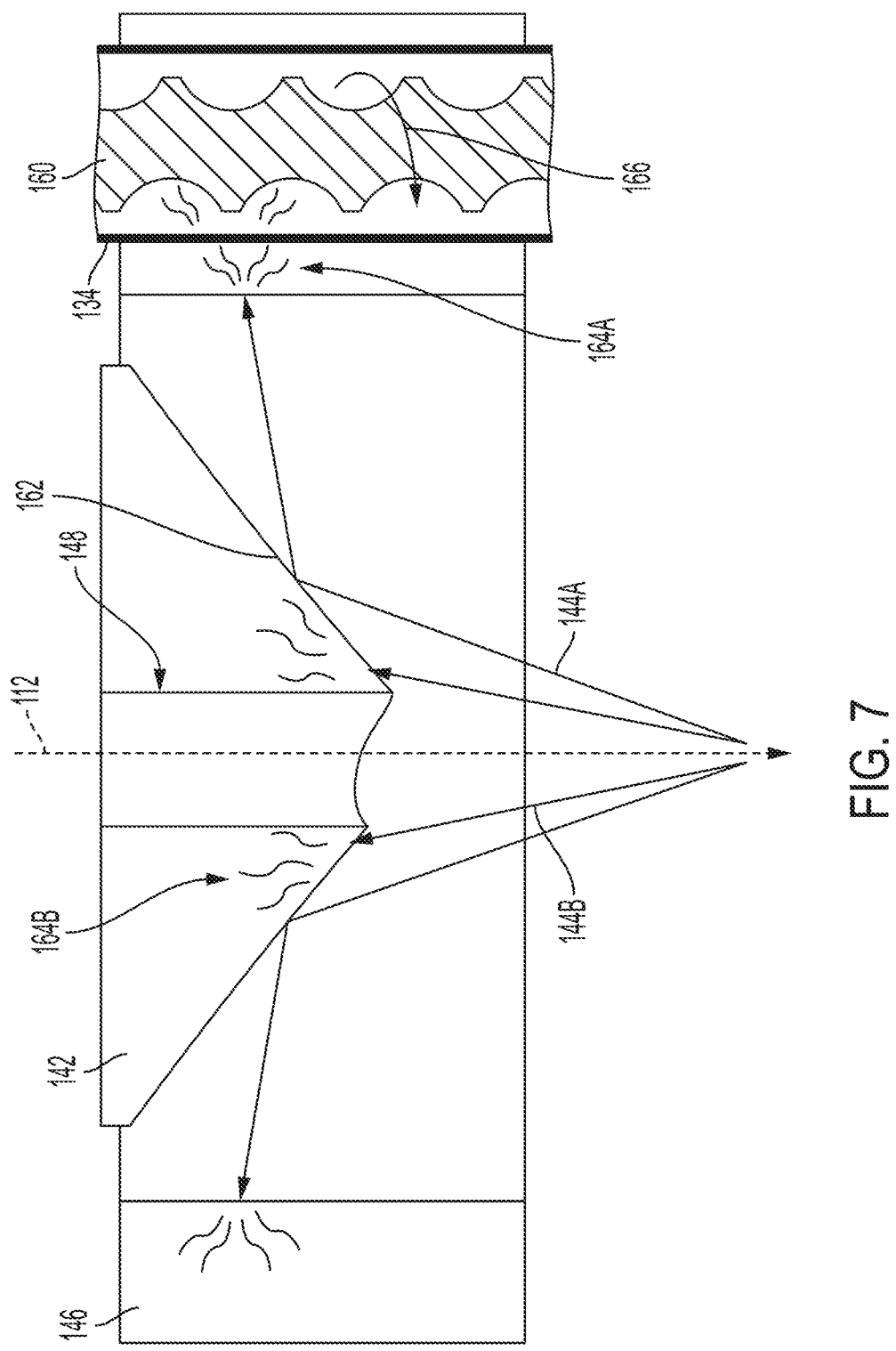
FIG. 7 shows a cross-section of one embodiment of a portion of an energy management system.

FIG. 7 depicts a cross-section of a portion of an energy management system of an optical system, for example as taken along line B-B of FIG. 6. In FIG. 7, it can be seen that incident light energy 112 may pass along a beam path through an aperture 148 of a beam block 142 in a first direction (e.g., toward a build surface). As discussed with reference to FIG. 5, light energy may travel in a second direction different from the first direction after being deflected, reflected, refracted, diffracted, scattered, or after otherwise deviating from the beam path. The light energy traveling in the second direction may be absorbed or deflected by various energy management components of the optical system. In various embodiments, a surface of a beam block and/or a heat sink may be configured to absorb and/or deflect portions of the light energy traveling in the second direction. For example, in some embodiments, a surface 162 of the beam block 142 may be configured to absorb a portion of the light energy, for example by including a light-absorbent coating or surface finish. In other embodiments, the surface 162 may be configured to deflect or reflect a portion of the light energy, for example by including a reflective coating or surface finish. In some embodiments, the surface 162 may configured to both absorb and reflect portions of the light energy, for example by including a coating or surface finish that is both reflective and absorbent.

For example, in some embodiments, a first portion 144A of the light energy may be deflected off of a surface 162 of the beam block 142. The first portion 144A may be absorbed as a first portion of heat energy 164A by the heat sink 146. In embodiments which include a heat transfer conduit 134, the first portion of heat energy 164A (or a portion thereof) may be transferred to the heat transfer conduit 134 from the heat sink. Additionally, in embodiments in which the heat transfer conduit carries a flow of working fluid 166, the first portion of the heat energy 164A or a portion thereof may be transferred to the working fluid to be carried away from the optical system. As noted above, in some embodiments, the heat transfer conduit may include a turbulence inducing component configured to cause turbulence and/or vortices in the flow of working fluid 166. For example, the turbulence inducing component 160 may comprise a rod inserted into the heat transfer conduit 134. The rod may include a spiral or thread around a circumference and along a length of the rod to cause the working fluid to flow in a spiral pattern around the rod, thereby improving a cooling effect of the working fluid. Additionally or alternatively, a second portion 144B of the light energy may be absorbed by the beam block 142 at the surface 162. In some embodiments, the beam block may be in thermal contact with the heat transfer conduit 134, for example via a heat transfer plate 140 as shown in FIG. 5 (it will be appreciated that the heat transfer plate may be cut off from view in the partial cross-section of FIG. 7, but may be physically and thermally coupled to the heat transfer conduit in a manner similar to the coupling of the heat sink 146 to the heat transfer conduit 134 of FIG. 7). Although the heat transfer conduits 134 are depicted as being inserted into through-holes of the heat sink 146, it will be appreciated that heat transfer conduits may be coupled to or in thermal contact with a heat transfer plate, a heat sink, or a beam block in any appropriate manner, including using the adjustable jaw arrangement described above with reference to FIG. 4.

FIGS. 8A-8C depict various embodiments of beam blocks 142 having various sizes and shapes of apertures 148. For example, FIG. 8A depicts a beam block 142 having a circular or round aperture 148, while the beam block of FIG. 8B includes a cross-shaped aperture wherein two elliptical shapes intersect such that their long axes extend in multiple directions. In FIG. 8C, the beam block 142 may include more than one aperture, for example a plurality of apertures 148. From the foregoing, it will be appreciated that an aperture of a beam block may be formed in any appropriate shape or configuration, including an appropriate regular or irregular geometry, as the disclosure is not limited in this regard.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

The invention claimed is:

1. A method for additive manufacturing, the method comprising:

directing laser energy along a beam path toward a build surface;

fusing a portion of a precursor material on the build surface;

providing an optics support structure having a plurality of support columns and a plurality of support plates spanning between two or more support columns at respective locations along a length of the plurality of support columns; and supporting at least one optical component of an optics assembly on the plurality of support columns.

2. The method of claim 1, further comprising moving an optical system in at least one direction using a gantry system.

3. The method of claim 2, wherein moving the optical system in the at least one direction includes displacing the optical system a maximum of about 40 micrometers in a direction away from an axis of the optical system when the optical system vibrates at a resonance frequency of the optical system.

4. The method of claim 1, wherein the optics assembly and the optics support structure have a resonance frequency between about 400 hertz (Hz) and about 450 Hz.

5. The method of claim 1, wherein at least one support plate has a thickness between about 15 millimeters (mm) and about 25 mm.

6. The method of claim 1, wherein at least one support column includes a tube formed from a composite material.

7. The method of claim 1, further comprising maintaining alignment of the at least one optical component using the plurality of support plates during thermal expansion of the plurality of support plates.

8. The method of claim 7, wherein each support plate is axisymmetric.

9. The method of claim 1, further comprising providing each of the plurality of support plates with an optical support aperture at or near a center of the support plate and receiving the at least one optical component in the optical support aperture.

10. The method of claim 1, further comprising providing each of the plurality of support plates with at least two support coupling holes at or near a periphery of the support plate and engaging each of the at least two support coupling holes with a respective support column of the two or more support columns.

11. The method of claim 1, further comprising coupling at least one support plate to at least one support column using a clamp having a jaw extending from and cooperating with the at least one support plate to form a throat and receiving the at least one support column with the throat, providing a through hole aligned with a bore hole of the at least one support plate, and receiving a fastener with the through hole and the bore hole to adjust a size of the throat to fasten the at least one support column within the throat.

12. The method of claim 1, further comprising transferring heat between at least one of the plurality of support plates and a heat transfer conduit carrying a working fluid.

13. The method of claim 12, further comprising making thermal contact between a thermal coupling hole on each of the plurality of support plates with the heat transfer conduit.

14. The method of claim 12, further comprising circulating the working fluid through a return conduit within a support column.

15. The method of claim 1, further comprising providing a plurality of heat transfer conduits and a plurality of heat transfer plates, each of the plurality of heat transfer plates spanning between two or more heat transfer conduits and comprising a heat transfer component at least partially surrounding the beam path between two optical components of the optics assembly, absorbing and/or deflecting light energy and/or heat energy using the plurality of heat transfer conduits and the plurality of heat transfer plates, and receiving heat energy from the plurality of heat transfer plates using the plurality of heat transfer conduits.

16. The method of claim 15, further comprising deflecting light energy away from the beam path using a beam block.

17. The method of claim 15, further comprising absorbing heat energy using a heat sink.

18. The method of claim 15, further comprising flowing a coolant through the plurality of heat transfer conduits and absorbing heat energy from the plurality of heat transfer plates and/or the plurality of support plates using the coolant.

19. The method of claim 18, further comprising receiving a coil in thermal and fluid communication with the plurality of heat transfer conduits in a channel within each of the plurality of support plates.

20. The method of claim 1, wherein supporting the at least one optical component includes supporting the at least one optical component with two or more support plates.

21. The method of claim 20, further comprising supporting the at least one optical component with at least one platform spanning between and supported by two or more support posts.

\* \* \* \* \*